(12) United States Patent
Cha et al.

(10) Patent No.: US 12,348,428 B2
(45) Date of Patent: Jul. 1, 2025

(54) NETWORK CONGESTION CONTROL METHOD AND APPARATUS FOR IMPLEMENTING THE SAME

(71) Applicant: SAMSUNG SDS CO., LTD., Seoul (KR)

(72) Inventors: Jung Hwan Cha, Seoul (KR); Jung Eun Lee, Seoul (KR); Han Saem Seo, Seoul (KR); Shin Hyeok Kang, Seoul (KR); Ye Won Kang, Seoul (KR); Jong Sung Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 31 days.

(21) Appl. No.: 18/534,170

(22) Filed: Dec. 8, 2023

(65) Prior Publication Data
US 2024/0223506 A1    Jul. 4, 2024

(30) Foreign Application Priority Data
Dec. 29, 2022    (KR) .......................... 10-2022-0188279

(51) Int. Cl.
*H04L 47/27*    (2022.01)
*H04L 47/12*    (2022.01)
*H04L 47/283*   (2022.01)

(52) U.S. Cl.
CPC .............. *H04L 47/27* (2013.01); *H04L 47/12* (2013.01); *H04L 47/283* (2013.01)

(58) Field of Classification Search
None
See application file for complete search history.

(56) References Cited

U.S. PATENT DOCUMENTS

| | | | | |
|---|---|---|---|---|
| 6,757,255 B1* | 6/2004 | Aoki | ..................... | H04L 69/165 370/401 |
| 7,912,060 B1* | 3/2011 | Chen | ....................... | H04L 47/27 370/231 |
| 8,605,590 B2* | 12/2013 | Sivakumar | .............. | H04L 47/37 370/231 |
| 9,014,264 B1 | 4/2015 | Cheng et al. | | |
| 2011/0116380 A1* | 5/2011 | Sivakumar | .............. | H04L 47/10 370/235 |

(Continued)

FOREIGN PATENT DOCUMENTS

| | | |
|---|---|---|
| KR | 10-2014-0089251 A | 7/2014 |
| KR | 10-2016-0092737 A | 8/2016 |
| KR | 10-2020-0058994 A | 5/2020 |

OTHER PUBLICATIONS

Mittal,, Radhika et al., "Timely: RTT-based Congestion Control for the Datacenter", SIGCOMM '15, Aug. 17-21, 2015, London, United Kingdom, pp. 537-550.

*Primary Examiner* — Quang N Nguyen
(74) *Attorney, Agent, or Firm* — Sughrue Mion, PLLC

(57) ABSTRACT

The present disclosure according to at least one embodiment provides a network congestion control method performed by a computing device, the method comprising transmitting data in units of packets to a receiving terminal connected to a network by performing a first step of increasing a data transmission amount for the data by increasing a window size; and performing a second step of reducing the data transmission amount by reducing the window size in response to an increase in round trip time (RTT) exceeding a predefined threshold value.

19 Claims, 10 Drawing Sheets

(56) References Cited

U.S. PATENT DOCUMENTS

| | | | |
|---|---|---|---|
| 2014/0241163 A1* | 8/2014 | Lee | H04L 47/27 |
| | | | 370/235 |
| 2014/0355442 A1* | 12/2014 | Isobe | H04L 47/127 |
| | | | 370/235 |
| 2021/0112002 A1 | 4/2021 | Pan et al. | |
| 2021/0184981 A1 | 6/2021 | Kumar et al. | |
| 2022/0103484 A1 | 3/2022 | Penaranda Cebrian et al. | |
| 2022/0311711 A1 | 9/2022 | Jepsen et al. | |

* cited by examiner

NETWORK CONGESTION CONTROL METHOD AND APPARATUS FOR IMPLEMENTING THE SAME

CROSS-REFERENCE TO RELATED APPLICATION

This application claims priority from Korean Patent Application No. 10-2022-0188279 filed on Dec. 29, 2022, in the Korean Intellectual Property Office, and all the benefits accruing therefrom under 35 U.S.C. 119, the contents of which in its entirety are herein incorporated by reference.

BACKGROUND

1. Field

The present disclosure relates to a network congestion control method and an apparatus for implementing the same, and more particularly, to a network congestion control method of controlling network congestion that may occur during the transmission of data over a network and an apparatus for implementing the network congestion control method.

2. Description of the Related Art

Recently, there has been an increasing demand for high-performance computing (HPC) environments for applications such as artificial intelligence (AI)/machine learning (ML) training. These applications require network performance with high bandwidth and low latency that is difficult to achieve using conventional network technologies such as Transmission Control Protocol/Internet Protocol (TCP/IP). To address this, the Remote Direct Memory Access (RDMA) technology is employed, allowing data to be directly transferred from the sender's memory to the receiver's memory and bypassing the host's operating system (OS) and resources to deliver high performance.

Examples of the RDMA technology include InfiniBand and RDMA over Converged Ethernet (RoCE). InfiniBand is the most widely used RDMA protocol, but is disadvantageous due to its vendor dependence as being a proprietary technology of Mellanox Technologies Ltd., leading to limitations in requiring dedicated equipment and difficulty in customizing for customer-specific functionalities. On the other hand, InfiniBand employs its own proprietary protocol that is not compatible with traditional network technologies (such as TCP/IP) at each network layer, posing compatibility challenges with existing networks.

RoCE, which has been proposed to address the aforementioned compatibility issues of InfiniBand, applies Priority-based Flow Control (PFC) technology to Ethernet to provide a lossless communication environment. This, however, causes several security issues. In situations such as Incast (or network congestion), where traffic from multiple senders concentrates towards a few receivers, RoCE's PFC leads to severe network performance degradation such as head-of-line blocking and deadlocks.

In order to tackle the Incast problems associated with RoCE, numerous network congestion control techniques have been proposed. However, these methods suffer from an unfairness issue where during the transmission of data by multiple senders, new senders transmit data at significantly lower rates compared to existing senders.

Therefore, there is a demand for technology that is compatible with existing network technologies such as TCP/IP while preventing abrupt network performance degradation without compromising security. Additionally, there is a need to address the unfairness issue that can arise during the transmission of data by multiple senders.

SUMMARY

Aspects of the present disclosure provide a network congestion control method, which is capable of controlling network congestion that may occur during the transmission of data in a high-performance computing environment without compromising security and is compatible with existing network technologies such as Transmission Control Protocol/Internet Protocol (TCP/IP), and an apparatus for implementing the network congestion control method.

Aspects of the present disclosure also provide a network congestion control method, which can efficiently transmit data in line with the maximum data transmission capacity, without causing abrupt network performance degradation, using measurable metrics such as round trip time (RTT), instead of using network switches, and an apparatus for implementing the network congestion control method.

Aspects of the present disclosure also provide a network congestion control method, which is capable of addressing the unfairness issue where the data transmission rate differs between existing senders and new senders in an environment where multiple senders transmit data, and an apparatus for implementing the network congestion control method.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a network congestion control method performed by a computing device. The method comprises transmitting data in units of packets to a receiving terminal connected to a network by performing a first step of increasing a data transmission amount for the data by increasing a window size; and performing a second step of reducing the data transmission amount by reducing the window size in response to an increase in round trip time (RTT) exceeding a predefined threshold value.

In some embodiments, the performing the first step may comprise exponentially increasing the window size.

In some embodiments, the performing the first step may further comprise measuring the RTT in accordance with a predefined period or cycle while exponentially increasing the window size.

In some embodiments, the performing the second step may comprise measuring RTT and acquiring delivery rate, which indicates a number of packets for which acknowledgement signals have been received per unit time, and reducing the window size in response to an increase in the delivery rate being less than a first threshold value and the increase in RTT being greater than a second threshold value.

In some embodiments, the performing the second step may comprise reducing the window size in proportion to a number of packets currently being transmitted compared to a maximum number of packets that can be transmitted.

In some embodiments, the performing the second step may further comprise reducing the reduced window size by a predefined ratio in response to the reduced window size reaching a window size immediately prior to reduction of the data transmission amount and yet the increase in RTT exceeding the predefined threshold value.

In some embodiments, the performing the second step may further comprise reducing the reduced window size by a predefined ratio in response to a packet being dropped.

In some embodiments, the method may further comprise performing a third step of increasing the data transmission amount again by increasing the window size in response to a state where the increase in RTT is below the predefined threshold value being maintained for a predefined amount of time.

In some embodiments, the performing a third step may comprise increasing the window size in inverse proportion to a number of packets currently being transmitted compared to a maximum number of packets that can be transmitted.

In some embodiments, the method may further comprise transitioning to the second step in response to the increase in RTT exceeding the predefined threshold value in accordance with the increase in the data transmission amount.

In some embodiments, the method may further comprise transitioning to the first step in response to the state where the increase in RTT is below the predefined threshold value being maintained for the predefined amount of time despite the increase in the data transmission amount.

In some embodiments, the method may further comprise determining whether a variation in RTT between a previously transmitted packet and a currently transmitted packet exceeds a threshold value in response to an acknowledgement signal for a packet transmitted prior to adjustment of the data transmission amount being received, transitioning to the second step in response to the variation in RTT being equal to or greater than the threshold value, and transitioning to the first step in response to the variation in RTT being less than the threshold value.

In some embodiments, the method may further comprise transitioning to the first step in response to an acknowledgement signal for a packet transmitted after adjustment of the data transmission amount being received.

According to the aforementioned and other embodiments of the present disclosure, there is provided a computing device. The computing device comprises at least one processor, a memory loading a computer program, which is executed by the at least one processor; and a storage storing the computer program, wherein the computer program includes instructions for transmitting data in units of packets to a receiving terminal connected to a network by a performing a first step of increasing a data transmission amount for the data by increasing a window size, and performing a second step of reducing the data transmission amount by reducing the window size in response to an increase in round trip time (RTT) exceeding a predefined threshold value.

In some embodiments, the performing the first step may comprise exponentially increasing the window size.

In some embodiments, the performing the first step may further comprise measuring the RTT in accordance with a predefined period or cycle while exponentially increasing the window size.

In some embodiments, the performing the second step may comprise measuring RTT and acquiring delivery rate, which indicates a number of packets for which acknowledgement signals have been received per unit time, and reducing the window size in response to an increase in the delivery rate being less than a first threshold value and the increase in RTT being greater than a second threshold value.

In some embodiments, the performing the second step may comprise reducing the window size in proportion to a number of packets currently being transmitted compared to a maximum number of packets that can be transmitted.

In some embodiments, the performing the second step may further comprise reducing the reduced window size by a predefined ratio in response to the reduced window size reaching a window size immediately prior to reduction of the data transmission amount and yet the increase in RTT exceeding the predefined threshold value.

In some embodiments, the performing the second step may further comprise reducing the reduced window size by a predefined ratio in response to a packet being dropped.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
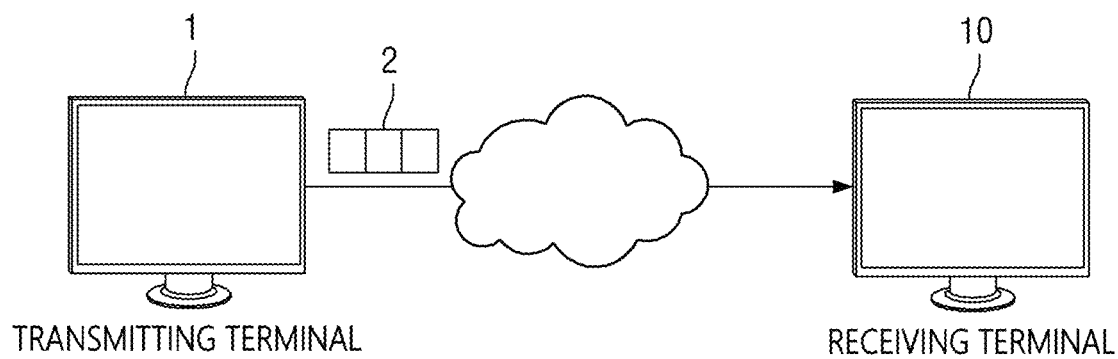
FIG. 1 is a schematic view illustrating the configuration of a system for controlling network congestion according to an embodiment of the present disclosure.

Hereinafter, example embodiments of the present disclosure will be described with reference to the attached drawings. The advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present disclosure will be described in detail with reference to the accompanying drawings.

FIG. 1 is a schematic view illustrating the configuration of a system for controlling network congestion according to an embodiment of the present disclosure. Referring to FIG. 1, the system according to an embodiment of the present disclosure includes a computing device 1 and a receiver terminal 10, and the computing device 1 and the receiving terminal 10 are connected via a network.

The computing device 1 corresponds to a transmitter terminal sending data 2 to the receiving terminal 10 via the network, and there may exist multiple other transmitter terminals that send data to the receiving terminal 10.

The computing device 1 and the receiving terminal 10 may be, for example, mobile computing devices such as smartphones, tablet personal computers (PCs), laptops, personal digital assistants (PDAs) or stationary computing devices such as personal desktop PCs.

When the computing device 1 sends the data 2 to the receiving terminal 10, the data 2 is transmitted in units of multiple packets. The computing device 1 may send data to the receiving terminal 10 based on a communication protocol such as Transmission Control Protocol/Internet Protocol (TCP/IP) or Remote Direct Memory Access (RDMA).

When the computing device 1 sends the data 2 to the receiving terminal 10 via the network, the computing device 1 performs an operation for transmitting data in accordance with bandwidth-delay product (BDP), which is the maximum data transmission capacity.

First, the computing device 1 increases the data transmission amount by increasing the window size when sending the data 2 to the receiving terminal 10 in units of packets.

While increasing the data transmission amount, the computing device 1 may measure round trip time (RTT) at regular intervals of time. For example, RTT may be measured whenever the transmission of each packet is completed.

The computing device 1 may continuously observe changes in RTT and may identify how much the RTT has increased or decreased by using the difference between a previous RTT measurement and a current RTT measurement.

If an increase in RTT exceeds a predefined threshold value, the computing device 1 determines that the network is in a congested state and that the data transmission amount has exceeded the BDP. In this case, the computing device 1 may control network congestion by reducing the data transmission amount to approach the BDP.

In one embodiment, the computing device 1 may reduce the data transmission amount by reducing the window size. In this case, the computing device 1 may reduce the window size in proportion to the number of packets currently being transmitted (or inflight rate) compared to the maximum number of packets that can be transmitted.

According to the configuration of the system of FIG. 1, it is possible to control network congestion without compromising security, using measurable metrics such as RTT, instead of using network switches. Additionally, the system of FIG. 1 is compatible with existing network technologies such as TCP/IP, and can address the unfairness issue where the data transmission rate differs between existing and new sender terminals in an environment where multiple sender terminals transmit data to a receiver terminal.

FIGS. 2 through 5 are flowcharts illustrating a network congestion control method according to an embodiment of the present disclosure.

Figure 10:
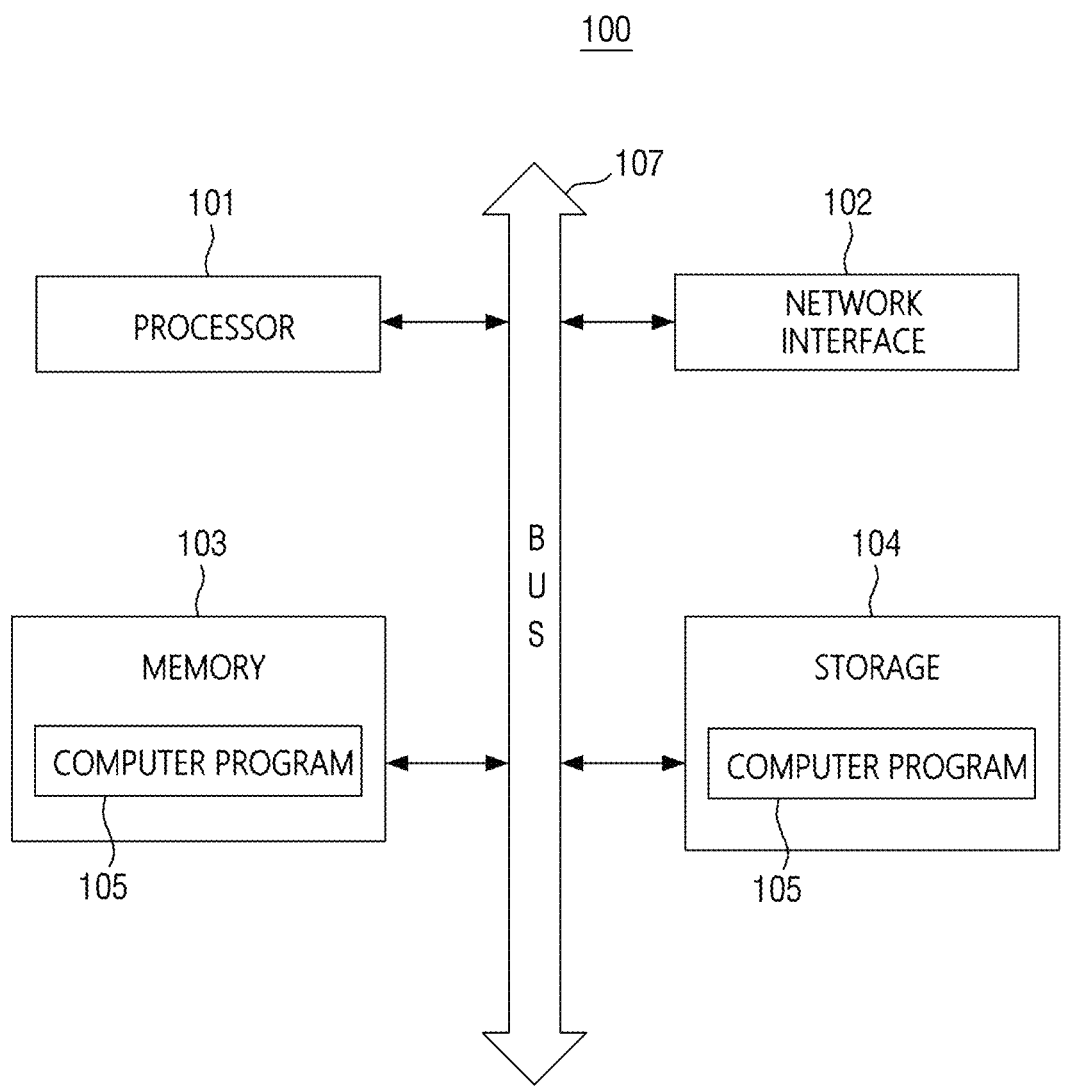
FIG. 10 illustrates a hardware configuration of an exemplary computing system that can implement methods according to an embodiment of the present disclosure.

The network congestion control method according to an embodiment of the present disclosure may be executed by a computing device 100 described in FIG. 10, which may be identical to the computing device 1 of FIG. 1. The computing device 100 may be a computing device equipped with an application program execution environment. The computing device 100 may be a device capable of performing computational tasks, such as, for example, a PC, server, a laptop, or a smartphone.

The descriptions of the entity that performs operations included in the network congestion control method according to an embodiment of the present disclosure may be omitted, and it should be noted that this entity is the computing device 100.

According to the embodiment of FIGS. 2 through 5, it is possible to control network congestion that may occur during the transmission of data in a high-performance computing environment without compromising security.

Figure 2:
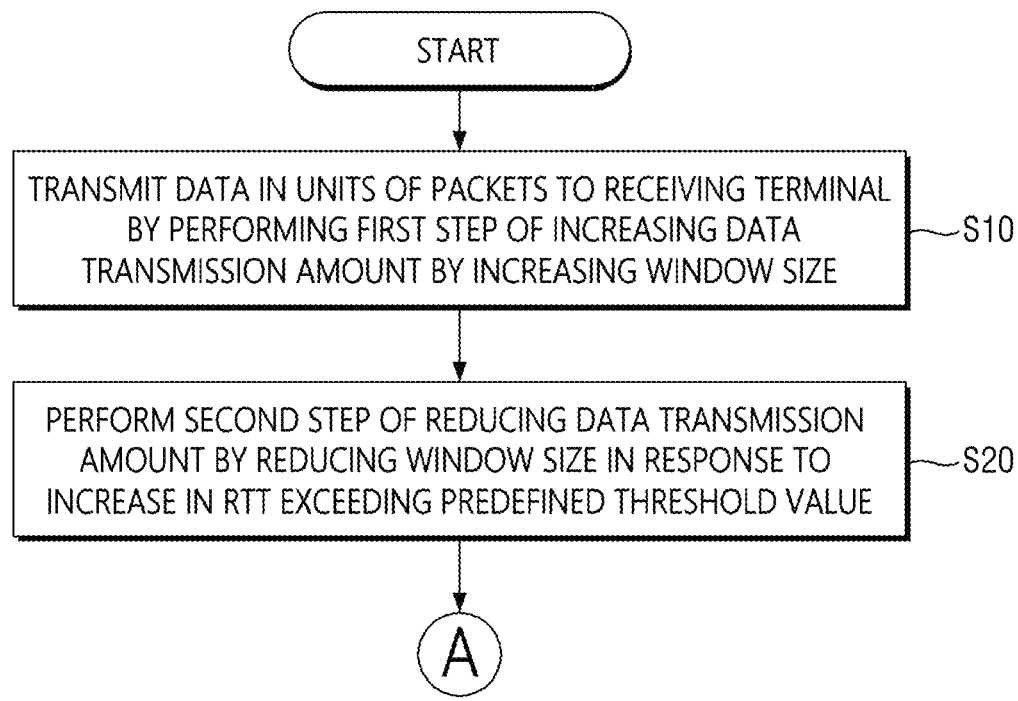
FIG. 2 is a flowchart illustrating a method of controlling network congestion according to an embodiment of the present disclosure.
Figure 7:
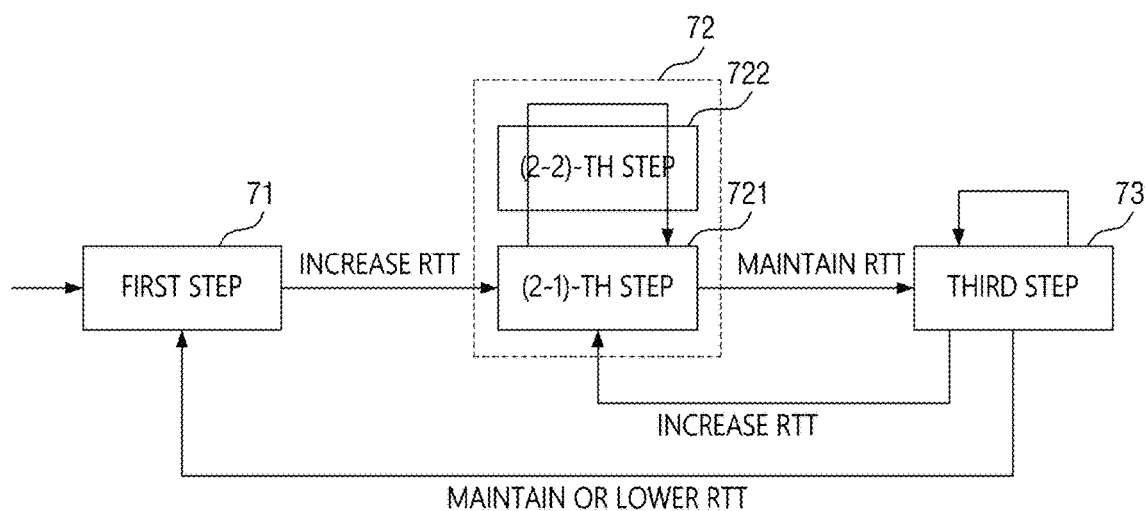
FIG. 7 illustrates an example of the transition between states for network congestion control according to some embodiments of the present disclosure.

Referring to FIG. 2, in operation S10, the computing device 100 sends data in units of packets to a receiving terminal connected thereto via the network. Referring to FIG. 7, the computing device 100 performs a first step 71 of increasing the data transmission amount by increasing the window size.

In one embodiment, in operation S10, the computing device 100 may exponentially increase the window size to increase the data transmission amount. For example, the computing device 100 may exponentially increase the window size to increase the data transmission amount using Equation (1):

$$IF1 = 2/\ln 2. \quad (1)$$

Also, in operation S10, the computing device 100 may measure RTT in accordance with a predetermined period or cycle while exponentially increasing the window size and the data transmission amount. RTT is the time taken until an acknowledgment (ACK) signal is received after a packet is sent, and a higher RTT value indicates delayed packet transmission.

As an example, RTT may be measured whenever the transmission of each packet is completed. That is, when the time taken to receive an ACK signal after the transmission of a single packet is considered one cycle, RTT may be measured every cycle. One cycle may be set in accordance with a user setting, either as the time taken to receive an ACK signal after sending one packet or after sending three packets.

As another example, RTT may be measured at intervals of a predetermined amount of time set through a configuration setting for the computing device 100.

Thereafter, referring to FIGS. 2 and 7, in operation S20, in response to an increase in RTT exceeding the predefined threshold value, the computing device 100 performs a second step 72 by executing a second step 72 of reducing the data transmission amount by reducing the window size.

Figure 6:
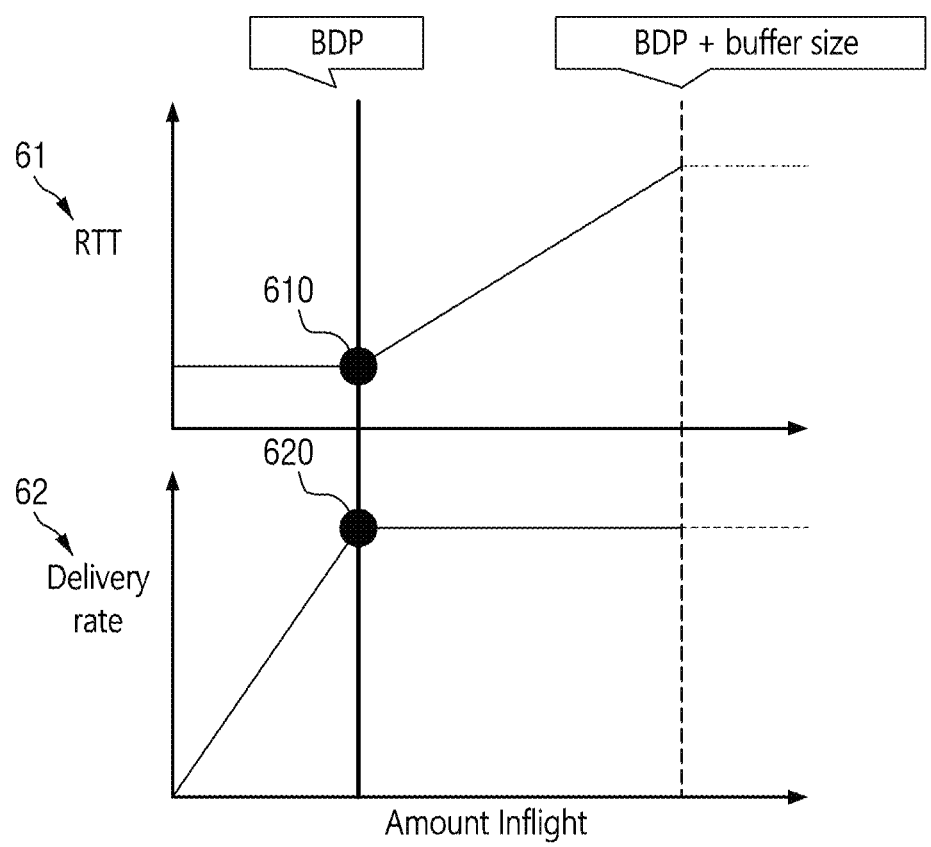
FIG. 6 illustrates an example of determining when to initiate network congestion control based on round trip time (RTT) and delivery rate according to some embodiments of the present disclosure.

Referring to FIG. 6, in operation S20, the computing device 100 may initiate network congestion control at a first time point 610 when an increase in RTT 61, measured during the increase of data transmission amount "Amount Inflight", exceeds a predefined threshold value, considering that the first time point 610 is the time when the data transmission amount "Amount Inflight" exceeds BDP, which is the maximum data transmission capacity. In other words, the computing device 100 may commence the process of reducing the data transmission amount "Amount Inflight" for network congestion control at the first time point 610.

Additionally, the computing device 100 may take into consideration delivery rate 62 together with the RTT 61 as an additional criterion for assessing network congestion. The delivery rate 62 indicates the count of packets for which ACKs have been received per unit of time. A lower delivery rate 62 indicates more delayed packet transmission.

In the example of FIG. 6, the computing device 100 may initiate network congestion control at a second time point 620 when an increase in the delivery rate 62 measured during the increase of the data transmission amount "Amount Inflight" falls below a predefined threshold value, considering that the second time point 620 is the time when the data transmission amount "Amount Inflight" exceeds the BDP. That is, the computing device 100 may commence the process of reducing the data transmission amount "Amount Inflight" for network congestion control at the second threshold value point 620.

In one embodiment, if an increase in delivery rate is below a first threshold value and an increase in RTT is above a second threshold value, the computing device 100 may determine that network congestion has occurred, and may reduce the data transmission amount for network congestion control by reducing the window size. That is, the computing device 100 may consider both the increase in delivery rate and the increase in RTT to initiate start network congestion control.

Figure 3:
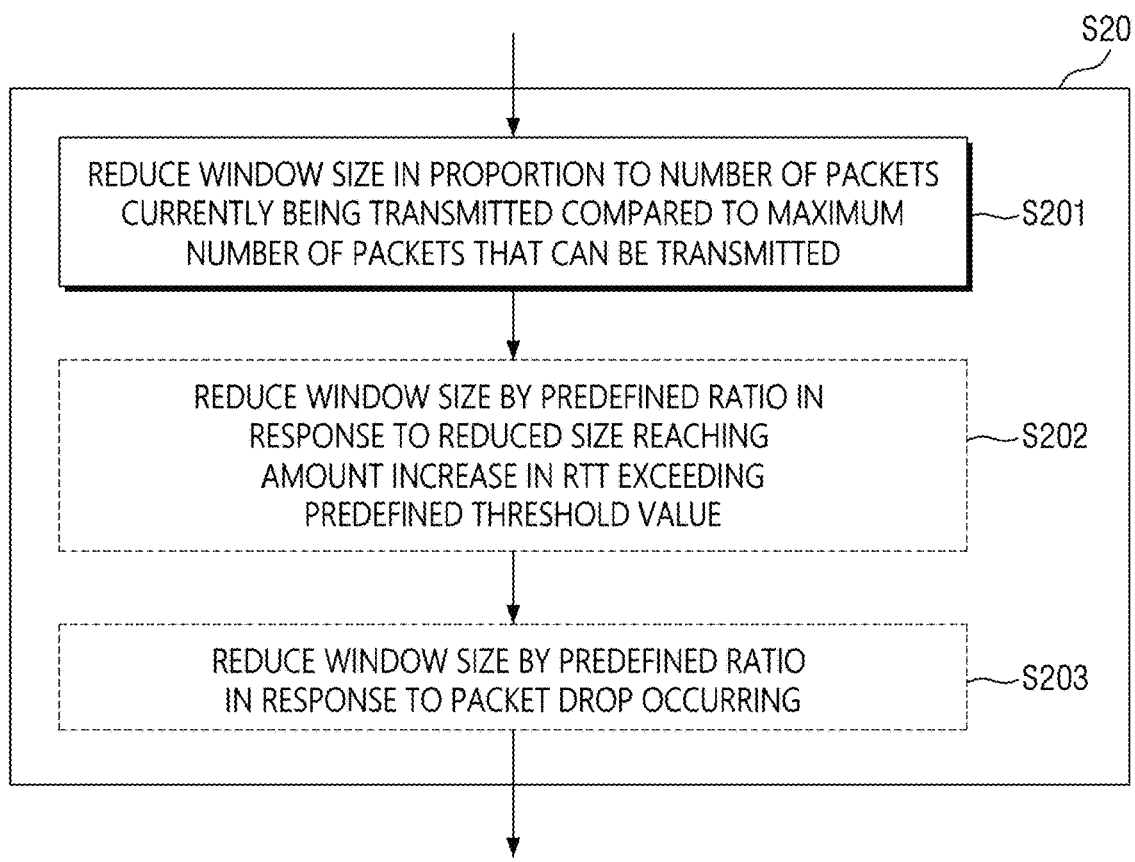
FIG. 3 is a detailed flowchart illustrating some of the operations of the method of FIG. 2.

In one embodiment, referring to FIG. 3, operation S20 may include sub-operations S201 through S203.

Referring to FIGS. 3 and 7, in sub-operation S201, if the increase in RTT exceeds a predefined threshold value, the computing device 100 may perform a (2-1)-th step 721 of reducing the window size in proportion to the inflight rate, which is the number of packets currently being transmitted compared to the maximum number of packets that can be transmitted, as indicated by Equations (2) and (3):

$$\text{InflightRate} = (\text{current inflight}/\text{max inflight});$$

$$DF2\_1 = 1\text{-}\{(1/IF1) * \text{inflightRate}\}.$$

In S202, even if the window size reduced by the (2-1)-th step 721 reaches the window size immediately prior to the reduction of the data transmission amount, the computing device 100 may perform a (2-2)-th step 722 of further reducing the window size by a predetermined ratio, if the increase in RTT exceeds the predefined threshold value. For example, when performing the (2-2)-th step 722, the computing device 100 may further reduce the window size reduced by the (2-1)-th step 721 by a ratio of 1/2.

In operation S203, if packet drop, which is the loss of transmitted packets, occurs during the reduction of the data transmission amount via the (2-1)-th step 721 of operation S201, the computing device 100 may further reduce the window size reduced by the (2-1)-th step 721 by the predetermined ratio (e.g., a ratio of 1/2).

Figure 4:
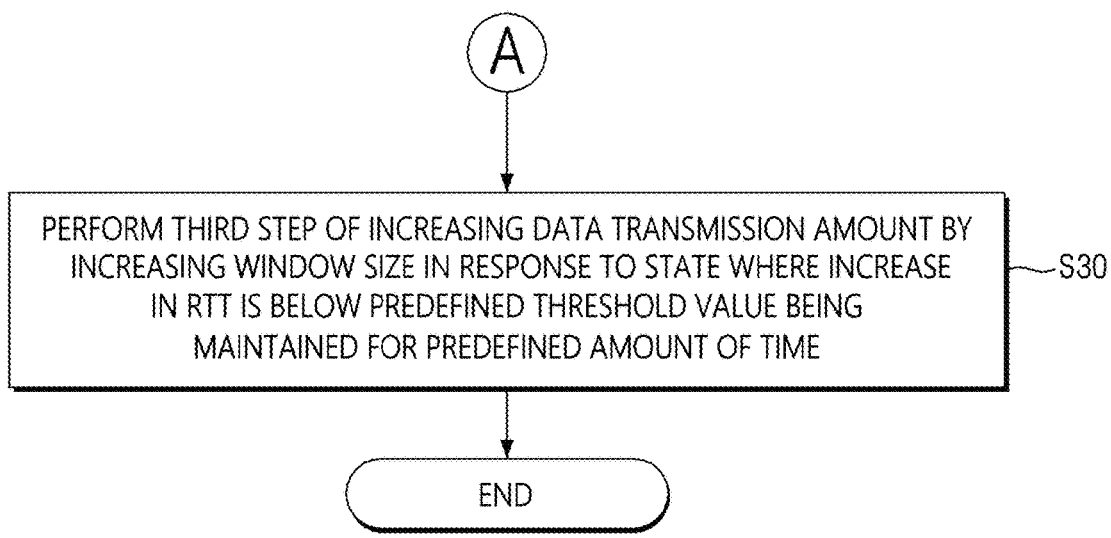
FIG. 4 is a flowchart illustrating an operation additionally performed after the operations of FIG. 2.
Figure 5:
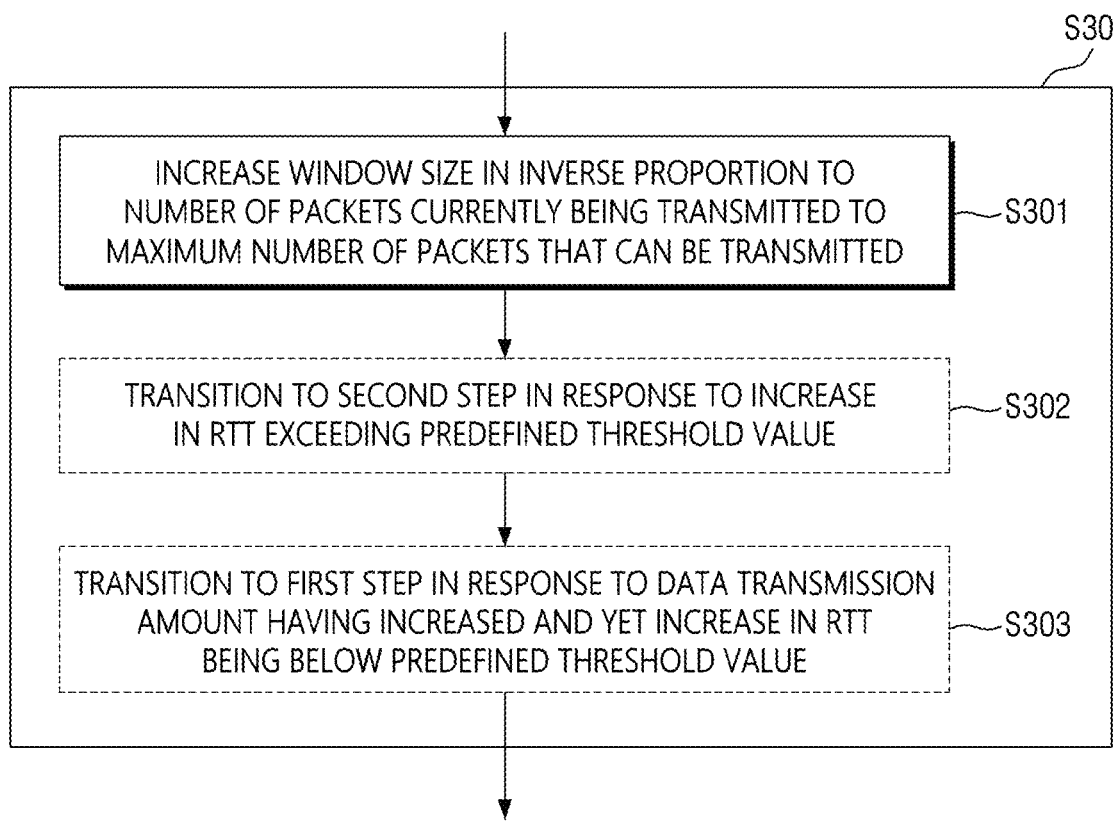
FIG. 5 is a detailed flowchart illustrating sub-operations of the step of FIG. 4.

In one embodiment, referring to FIG. 4, after performing operations S10 and S20 of FIG. 2, the computing device 100 may additionally perform operation S30.

Referring to FIGS. 4 and 7, in operation S30, in response to a state where the increase in RTT is below the predetermined threshold value being maintained for a predefined amount of time, the computing device 100 performs a third step 73 of increasing the data transmission amount back by increasing the window size.

In one embodiment, operation S30 may include sub-operations S301 through S303.

In sub-operation S301, in response to the state where the increase in RTT is below the predetermined threshold value being maintained for the predefined period, the computing device 100 may perform the third step 73 of increasing the window size in inverse proportion to the inflight rate calculated by Equation (2), as indicated by Equation (4):

$$IF3 = 1 + \{(IF1\text{-}1) * (1\text{-inflightRate})\}. \quad (4)$$

In one embodiment, in operation S302, the computing device 100 may transition to the second step 72 in response to the increase in RTT exceeding the predefined threshold value due to the increase of the data transmission amount by the third step 73.

In operation S303, even though the data transmission amount has increased again due to the third step 73, the computing device 100 may transition to the first step 71 in response to a state where the increase in RTT is below the predefined threshold value being maintained for a predefined amount of time.

Referring to FIG. 7, the computing device 100 may increase the data transmission amount in the first step 71 by increasing the window size. Then, if the increase in RTT exceeds the predefined threshold value, the computing device 100 may transition to the (2-1)-th step 721 to lower the data transmission amount by reducing the window size in proportion to the inflight rate.

In this case, if the reduced window size from the (2-1)-th step 721 reaches the window size immediately prior to the reduction of the data transmission amount and yet the increase in RTT exceeds the predefined threshold value, or if packet drop occurs, the computing device 100 may transition to the (2-2)-th step 722 to further lower the data transmission amount by reducing the window size by a predetermined ratio (e.g., a ratio of 1/2).

If, through the (2-1)-th step 721 and (2-2)-th step 722, a state where the increase in RTT is below the predefined threshold value is maintained for a predefined amount of time due to the reduction of the data transmission amount, the computing device 100 may transition to the third step 73 to increase the data transmission amount again. For example, if a period of time from the transmission of one packet and the receipt of an ACK signal for the corresponding packet is one cycle RTT remains consistently the same for two cycles, the computing device 100 may transition to the third step 73. In this case, the computing device 100 can increase the data transmission amount again by expanding the window size in inverse proportion to the inflight rate.

On the other hand, if the increase in RTT is beyond the predefined threshold value due to the increase of the data transmission amount through the third step 73, the computing device 100 may transition back to the (2-1)-th step 721 to lower the data transmission amount.

However, if a state where the increase in RTT is below the predefined threshold value is maintained for a predefined amount of time even as the data transmission amount increases due to the third step 73, the computing device 100 may transition to the first step 71 to further increase the data transmission amount. For example, if RTT remains consistently the same for five cycles or decreases for two cycles, the computing device 100 may transition to the first step 71.

In the network congestion control method according to an embodiment of the present disclosure, network congestion can be controlled by determining the occurrence of a network congestion situation using measurable metrics such as RTT, and adjusting the current data transmission amount upon the occurrence of the network congestion situation. As a result, data can be efficiently transmitted in line with the maximum data transmission capacity without significant degradation of network performance.

Furthermore, in environments where multiple senders transmit data, the unfairness issue where the data transmission rate differs between existing senders and new senders in an environment where multiple senders transmit data due to network congestion can be resolved.

A process in which the computing device 100 transitions to different steps depending on whether an ACK signal is received before or after adjusting the data transmission amount will hereinafter be described with reference to FIGS. 8 and 9.

Figure 8:
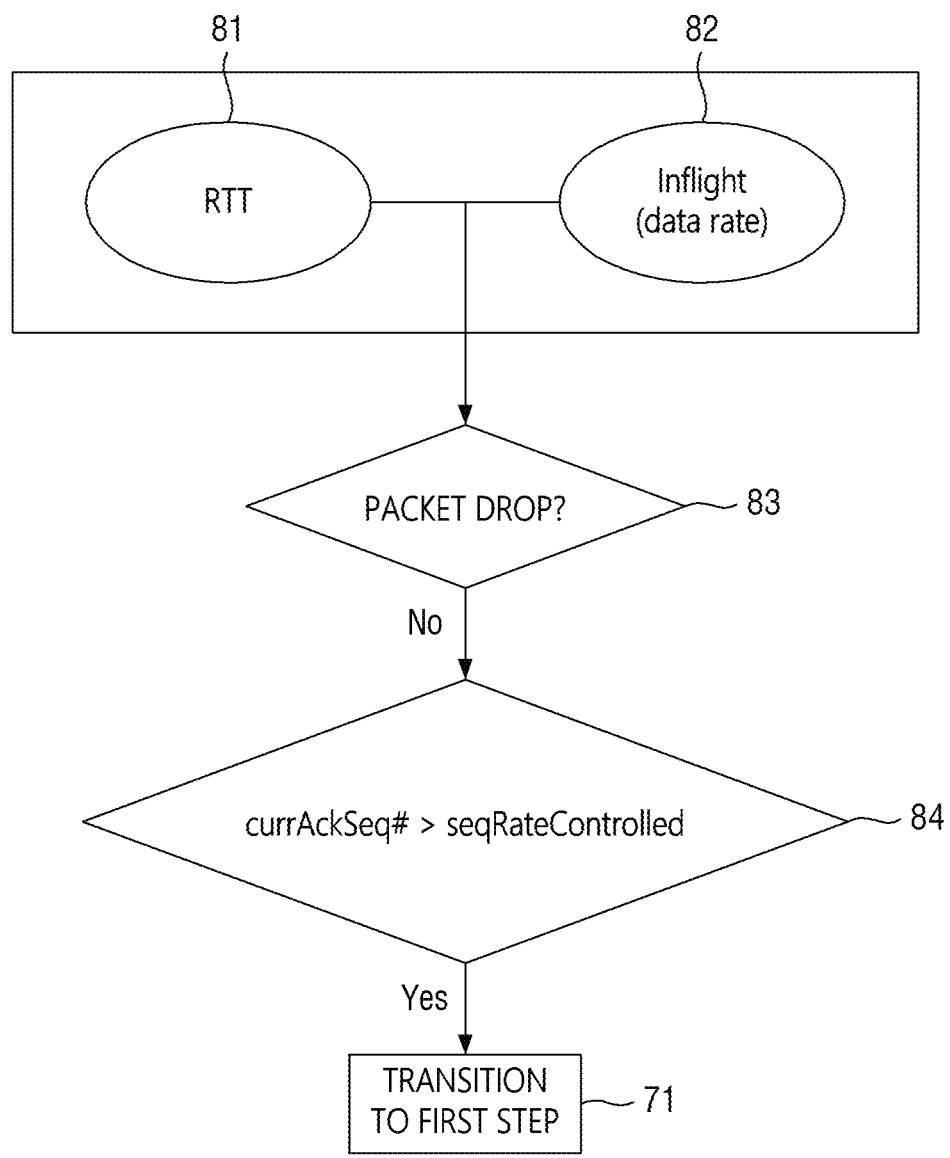
FIG. 8 illustrates an example of the transition between states in response to an acknowledgement (ACK) signal for a packet being received after the adjustment of the data transmission amount, according to some embodiments of the present disclosure.

In one embodiment, referring to FIG. 8, in response to an ACK signal being received for a transmitted packet after adjusting the data transmission amount, the computing device 100 may transition to the first step 71 to increase the data transmission amount.

In the example of FIG. 8, the computing device 100 can use RTT (81) and the amount of transmitted data (or data rate) (82) as metrics to determine whether the network is congested. Upon receiving an ACK signal for a transmitted packet, the computing device 100 first determines whether the packet has been lost (or packet drop has occurred) (83).

If the result of the determination indicates that the packet has not been lost, the computing device 100 compares currAckSeq#, which is the sequential number of the received ACK signal, with seqRateControlled, which is the sequential number of the packet for which the data transmission amount has been adjusted (84).

In this case, if currAckSeq# is greater than seqRateControlled, indicating that the ACK signal has been received after adjusting the data transmission amount, the computing device 100 may transition to the first step 71 to increase the data transmission amount.

Figure 9:
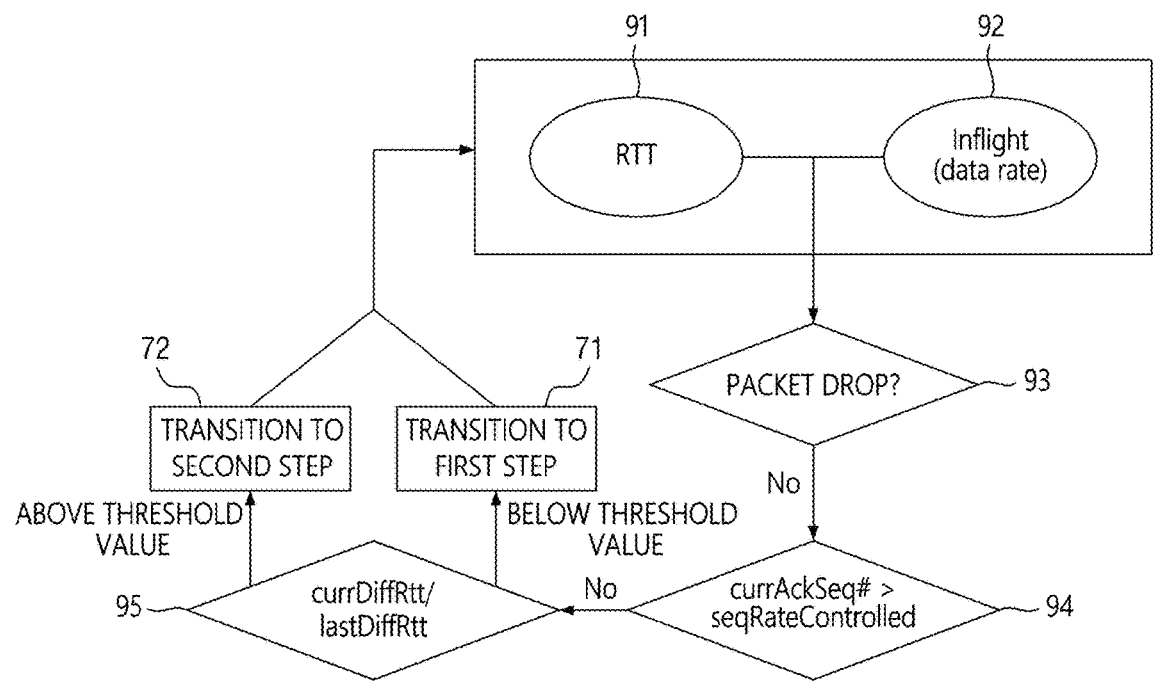
FIG. 9 illustrates an example of the transition between states in response to an ACK signal for a packet being received before the adjustment of the data transmission amount, according to some embodiments of the present disclosure.

In one embodiment, referring to FIG. 9, in response to an ACK signal being received for a packet transmitted prior to the adjustment of the data transmission amount, the computing device 100 may transition to different steps depending on whether a change in RTT between a previously transmitted packet and a currently transmitted packet exceeds a predefined threshold value.

In this case, if the change in RTT exceeds the predefined threshold value, the computing device 100 may switch to the second step 72 to lower the data transmission amount. Conversely, if the change in RTT is below the predefined threshold value, the computing device 100 may switch to the first step 71 to increase the data transmission amount.

In the example of FIG. 9, the computing device 100 may utilize RTT (91) and the amount of transmitted data (data rate) (92) as metrics to assess whether the network is congested. Upon receiving an ACK signal for a transmitted packet, the computing device 100 first assesses whether the packet has been lost (or packet drop has occurred) (93).

If the result of the determination indicates that the packet has not been lost, the computing device 100 compares currAckSeq#, which is the sequential number of the received ACK signal, with seqRateControlled, which is the sequential number of the packet for which the data transmission amount has been adjusted (94).

If currAckSeq is smaller than seqRateControlled, indicating that the ACK signal has been received before the adjustment of the data transmission amount, the computing device 100 evaluates whether the change in RTT between the previously transmitted packet and the currently transmitted packet, i.e., diffRtt (=lastDiffRtt/currDiffRtt), exceeds a predefined threshold value.

If diffRtt exceeds the predefined threshold value, the computing device 100 may transition to the second step 72 to lower the data transmission amount. As a result, the occurrence of network congestion can be prevented during the transmission of subsequent packets, and excessive increases in RTT that may be caused by tail latency can be prevented.

On the other hand, if diffRtt is below the predefined threshold value, the computing device 100 may transition to the first step 71 to increase the data transmission amount. Consequently, the deterioration of network utilization can be prevented by readily transitioning to the first step 71 during the transmission of subsequent packets.

In the network congestion control method according to an embodiment of the present disclosure, by frequently checking any change in RTT between previous and current packets and then promptly transitioning between different states for adjusting the data transmission amount, the situation of the network situation can be dynamically reflected in real time, allowing for an efficient utilization of the network.

FIG. 10 is a hardware configuration diagram of an exemplary computing device 100.

Referring to FIG. 10, the computing device 100 may include one or more processors 101, a bus 107, a network interface 102, a memory 103, which loads a computer program 105 executed by the processors 101, and a storage 104 for storing the computer program 105.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing device 100 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense only and not for purposes of limitation.

What is claimed is:

1. A network congestion control method performed by a computing device, comprising:
    transmitting data in units of packets to a receiving terminal connected to a network by performing a first step of increasing a data transmission amount for the data by increasing a window size;
    performing a second step of reducing the data transmission amount by reducing the window size in response to an increase in round trip time (RTT) exceeding a predefined threshold value;
    determining whether a variation in RTT between a previously transmitted packet and a currently transmitted packet exceeds a threshold value in response to an acknowledgement signal for a packet transmitted prior to adjustment of the data transmission amount being received;
    transitioning to the second step in response to the variation in RTT being equal to or greater than the threshold value; and
    transitioning to the first step in response to the variation in RTT being less than the threshold value.

2. The network congestion control method of claim 1, wherein the performing the first step comprises exponentially increasing the window size.

3. The network congestion control method of claim 2, wherein the performing the first step further comprises measuring the RTT in accordance with a predefined period or cycle while exponentially increasing the window size.

4. The network congestion control method of claim 1, wherein the performing the second step comprises measuring RTT and acquiring delivery rate, which indicates a number of packets for which acknowledgement signals have been received per unit time, and reducing the window size in response to an increase in the delivery rate being less than a first threshold value and the increase in RTT being greater than a second threshold value.

5. The network congestion control method of claim 1, wherein the performing the second step comprises reducing the window size in proportion to a number of packets currently being transmitted compared to a maximum number of packets that can be transmitted.

6. The network congestion control method of claim 5, wherein the performing the second step further comprises reducing the reduced window size by a predefined ratio in response to the reduced window size reaching a window size immediately prior to reduction of the data transmission amount and yet the increase in RTT exceeding the predefined threshold value.

7. The network congestion control method of claim 5, wherein the performing the second step further comprises reducing the reduced window size by a predefined ratio in response to a packet being dropped.

8. The network congestion control method of claim 1, further comprising:
performing a third step of increasing the data transmission amount again by increasing the window size in response to a state where the increase in RTT is below the predefined threshold value being maintained for a predefined amount of time.

9. The network congestion control method of claim 8, wherein the performing the third step comprises increasing the window size in inverse proportion to a number of packets currently being transmitted compared to a maximum number of packets that can be transmitted.

10. The network congestion control method of claim 8, further comprising:
transitioning to the second step in response to the increase in RTT exceeding the predefined threshold value in accordance with the increase in the data transmission amount.

11. The network congestion control method of claim 8, further comprising:
transitioning to the first step in response to the state where the increase in RTT is below the predefined threshold value being maintained for the predefined amount of time despite the increase in the data transmission amount.

12. The network congestion control method of claim 1, further comprising:
transitioning to the first step in response to an acknowledgement signal for a packet transmitted after adjustment of the data transmission amount being received.

13. A computing device comprising:
at least one processor;
a memory loading a computer program, which is executed by the at least one processor, and
a storage storing the computer program, wherein the computer program includes instructions for:
transmitting data in units of packets to a receiving terminal connected to a network by a performing a first step of increasing a data transmission amount for the data by increasing a window size; and
performing a second step of reducing the data transmission amount by reducing the window size in response to an increase in round trip time (RTT) exceeding a predefined threshold value;
determining whether a variation in RTT between a previously transmitted packet and a currently transmitted packet exceeds a threshold value in response to an acknowledgement signal for a packet transmitted prior to adjustment of the data transmission amount being received;
transitioning to the second step in response to the variation in RTT being equal to or greater than the threshold value; and
transitioning to the first step in response to the variation in RTT being less than the threshold value.

14. The computing device of claim 13, wherein the performing the first step comprises exponentially increasing the window size.

15. The computing device of claim 13, wherein the performing the first step further comprises measuring the RTT in accordance with a predefined period or cycle while exponentially increasing the window size.

16. The computing device of claim 13, wherein the performing the second step comprises measuring RTT and acquiring delivery rate, which indicates a number of packets for which acknowledgement signals have been received per unit time, and reducing the window size in response to an increase in the delivery rate being less than a first threshold value and the increase in RTT being greater than a second threshold value.

17. The computing device of claim 13, wherein the performing the second step comprises reducing the window size in proportion to a number of packets currently being transmitted compared to a maximum number of packets that can be transmitted.

18. The computing device of claim 13, wherein the performing the second step further comprises reducing the reduced window size by a predefined ratio in response to the reduced window size reaching a window size immediately prior to reduction of the data transmission amount and yet the increase in RTT exceeding the predefined threshold value.

19. The computing device of claim 13, wherein the performing the second step further comprises reducing the reduced window size by a predefined ratio in response to a packet being dropped.

* * * * *